US008469570B2

(12) United States Patent
Tominaga et al.

(10) Patent No.: US 8,469,570 B2
(45) Date of Patent: Jun. 25, 2013

(54) VEHICLE HEADLIGHT

(75) Inventors: Motonori Tominaga, Anjo (JP); Takahito Nishii, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 61 days.

(21) Appl. No.: 13/199,667

(22) Filed: Sep. 7, 2011

(65) Prior Publication Data

US 2012/0057365 A1 Mar. 8, 2012

(30) Foreign Application Priority Data

Sep. 8, 2010 (JP) ................................. 2010-200879

(51) Int. Cl.
*B60Q 1/04* (2006.01)
*F21V 29/00* (2006.01)

(52) U.S. Cl.
USPC ............................ 362/547; 362/294; 362/538

(58) Field of Classification Search
USPC ................................. 362/507, 538, 547, 294
See application file for complete search history.

(56) References Cited

U.S. PATENT DOCUMENTS

| | | | | |
|---|---|---|---|---|
| 7,985,013 | B2 * | 7/2011 | Yasuda | 362/547 |
| 2003/0063439 | A1 | 4/2003 | Wei et al. | |
| 2003/0131970 | A1 | 7/2003 | Carter et al. | |
| 2004/0202007 | A1 | 10/2004 | Yagi et al. | |
| 2008/0253127 | A1 | 10/2008 | Willwohl et al. | |
| 2010/0091487 | A1 | 4/2010 | Shin | |
| 2010/0102694 | A1 | 4/2010 | Shin | |
| 2010/0246204 | A1 * | 9/2010 | Inaba | 362/539 |

FOREIGN PATENT DOCUMENTS

| | | |
|---|---|---|
| JP | 2004-311224 | 11/2004 |
| JP | 2008-059965 | 3/2008 |
| JP | 3148089 | 1/2009 |
| JP | 2009-064943 | 3/2009 |
| JP | 2009-509309 | 3/2009 |
| JP | 2009-212019 | 9/2009 |
| JP | 2010-092831 | 4/2010 |
| JP | 2010-103454 | 5/2010 |

OTHER PUBLICATIONS

Office Action issued Jul. 24, 2012 in corresponding Japanese Application No. 2010-200879 with English translation.

* cited by examiner

*Primary Examiner* — Peggy A. Neils
(74) *Attorney, Agent, or Firm* — Harness, Dickey & Pierce, PLC

(57) ABSTRACT

The vehicle head light is provided with a heat radiating member including a pillar member provided to extend from a bottom wall of a housing, on which a light source is mounted, a heat radiating fins fixed radially to the outer periphery of the pillar member, and a guide wall provided surrounding sides of the heat radiating fins. The guide wall is sloped with respect to bottom wall of the housing so that spaces each formed by adjacent two of the heat radiating fins and the guide wall become narrower with increasing distance from the lower end of the guide wall. The guide wall is formed with slits to make air communication between the light chamber and each of the spaces, the slits being shaped to be narrower with increasing distance from the lower end of the guide wall.

5 Claims, 4 Drawing Sheets

VEHICLE HEADLIGHT

This application claims priority to Japanese Patent Application No. 2010-200879 filed on Sep. 8, 2010, the entire contents of which are hereby incorporated by reference.

BACKGROUND OF THE INVENTION

1. Field of the Invention

The present invention relates to a vehicle head light including a light source having a high heat-generation density such as a light-emitting diode, which degrades in light emission efficiency and life span in a high-temperature condition.

2. Description of Related Art

There is known a vehicle head light having a structure in which a projection lens, a reflector and a light source are disposed in this order from its front end, and a heat radiating member is mounted on the light source to radiate heat generated from the light source. For example, refer to Japanese Patent Application Laid-open No. 2004-311224 (Patent document 1), or No. 2009-212019 (Patent document 2).

In the vehicle head light described in Patent document 1, the heat radiating member is formed with a comb-shaped heat radiating fin extending downward. In the vehicle head light described in Patent document 2, the heat radiating member is formed with a plurality of heat radiating fins extending upward or downward.

However, the conventional vehicle head light as described in Patent document 1 or 2 has a problem in that, since the temperature of the heat radiating fin decreases with increasing distance from the light source, and accordingly, the temperature of the distal end of the fin is low, the heat radiation efficiency of the heat radiating member is not high enough for its size, and accordingly the heat radiating member has to be made large in size.

SUMMARY

An embodiment provides a vehicle head light comprising:

a housing formed with an opening at a front end of the housing;

a lens cover fixed to the opening to close an internal space of the housing as a light chamber;

a light source disposed in the light chamber; and a heat radiating member disposed in the light chamber to radiate heat generated from the light source to the light chamber, wherein the heat radiating member includes:

a pillar member provided to extend from a bottom wall of the housing, the light source being mounted on an upper end of the pillar member;

heat radiating fins having a plate shape and fixed radially to an outer periphery of the pillar member so as to extend in a longitudinal direction of the pillar member; and a guide wall provided surrounding sides of the heat radiating fins, the guide wall being sloped with respect to the bottom wall of the housing to approach the pillar member with increasing distance from a lower end of the guide wall so that spaces each formed by adjacent two of the heat radiating fins and the guide wall become narrower with increasing distance from the lower end of the guide wall, the guide wall being formed with slits to make air communication between the light chamber and each of the spaces, the slits being shaped to be narrower with increasing distance from the lower end of the guide wall.

According to the present invention, there is provided a vehicle head light with a compact and high efficient heat radiating member.

Other advantages and features of the invention will become apparent from the following description including the drawings and claims.

PREFERRED EMBODIMENTS OF THE INVENTION

Figure 1:
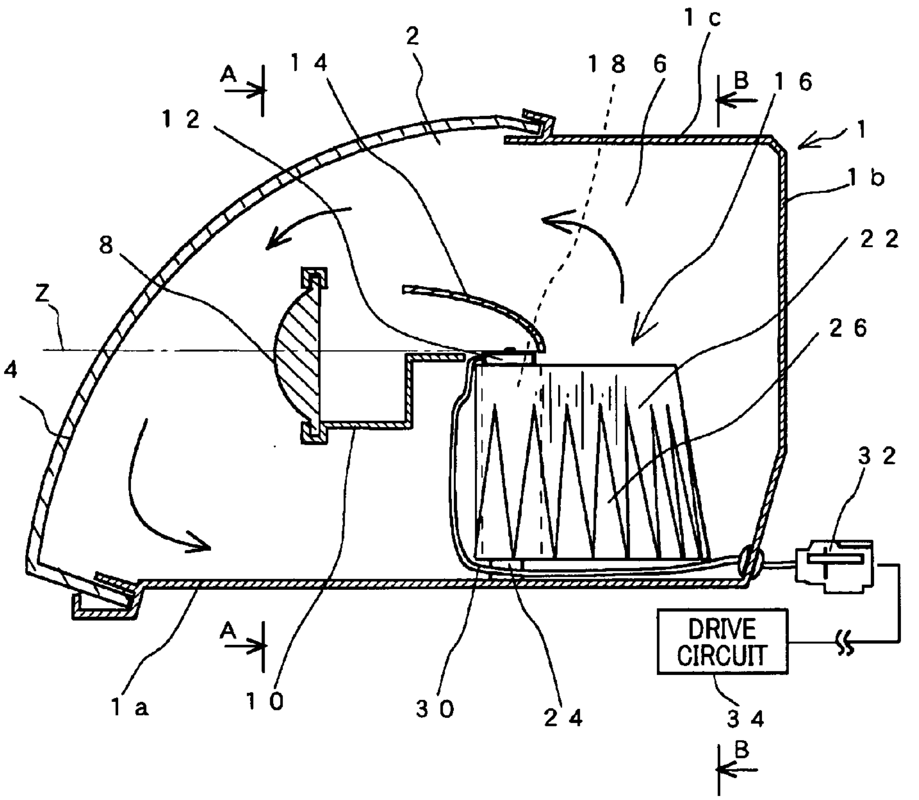
FIG. 1 is a longitudinal cross-sectional view of a vehicle head light according to an embodiment of the invention.

In FIG. 1 which is a longitudinal cross-sectional view of a vehicle head light according to an embodiment of the invention, 1 denotes a housing formed with a front opening 2. A lens cover 4 is fitted to the front opening 2 to close the housing 1. A light chamber 6 is formed by the housing 1 and the lens cover 4.

Inside the light chamber 6, a projection lens 8, a shade 10 and a light source 12 are disposed in this order from the front to back along the light axis Z. A reflector 14 having an inner reflection surface in a curved shape such as paraboloid of revolution is disposed opposite the light source 12.

In this embodiment, the projection lens 8 is a plane-convex lens. The projection lens 8 is located such that the focal point of the projection lens 8 and the focal point of the reflector 14 are at the same position. Part of the light reflected from the reflector 14 is blocked by the shade 10, and part of the light not blocked by the shade 10 is projected forward by the projection lens 8. In this embodiment, the shade 10 serves also as a support member of the projection lens 8.

It should be noted that the vehicle head light of this embodiment is a projector type light including a projection lens and a reflector, the present invention is applicable to a reflector type light or a direct projection type light.

Figure 2:
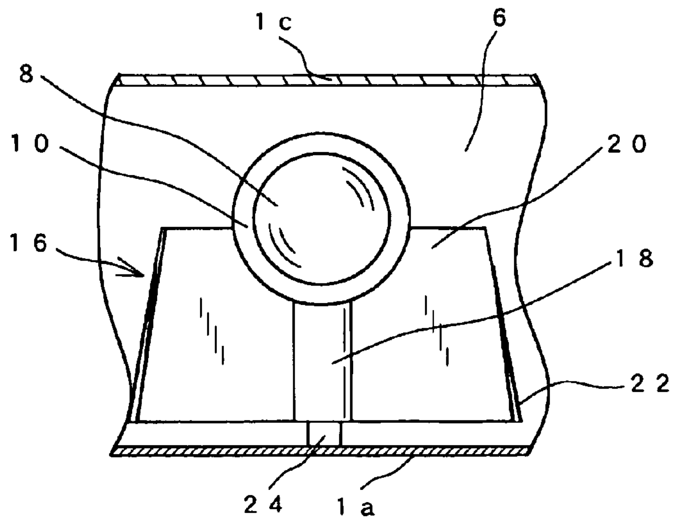
FIG. 2 is a cross-sectional view of FIG. 1 taken along the line A-A.
Figure 3:
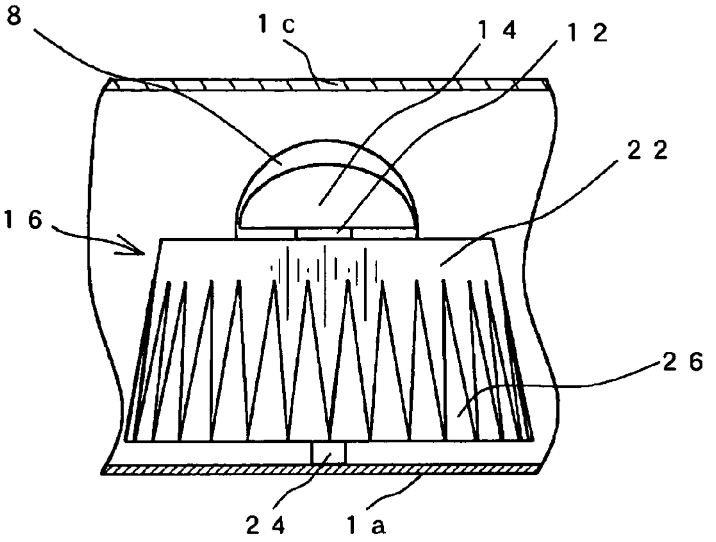
FIG. 3 is a cross-sectional view of FIG. 1 taken along the line B-B.

The light source 12 is constituted of one or more light emitting diodes. The light source 12 is disposed on a heat radiating member 16 accommodated in the light chamber 6. The heat radiating member 16 is constituted of a pillar member 18, heat radiating fins 20 and a guide wall 22. The pillar member 18 is formed in a shape of a circular cylinder. As shown in FIGS. 2 and 3, the pillar member 18 is fixed to the upper end of a support member 24 formed to project from the bottom wall 1*a* of the housing 1 at its lower end so as to extend upward. The light source 12 is mounted on the upper end surface of the pillar member 18.

Figure 4:
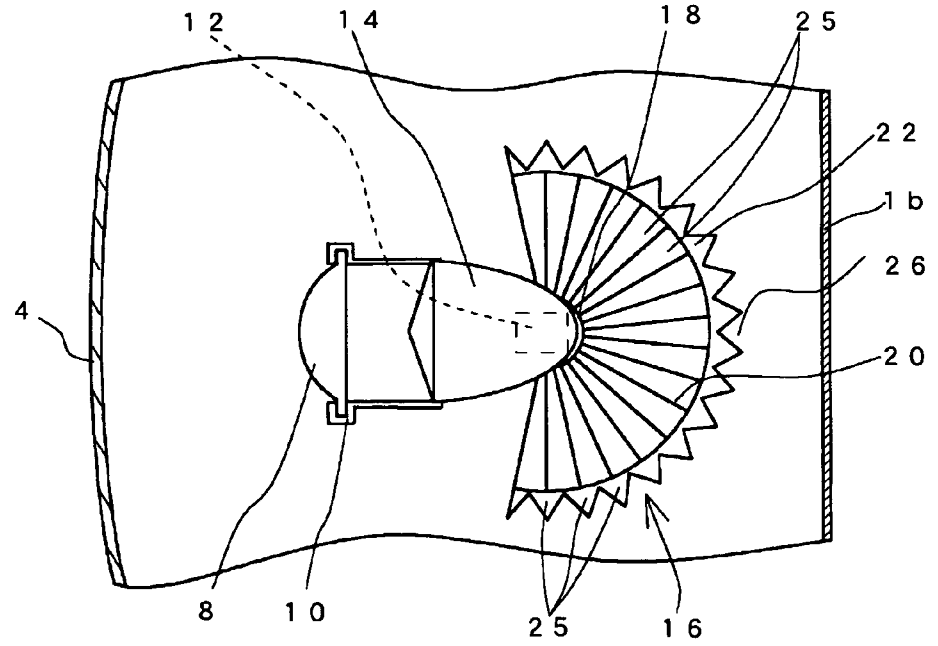
FIG. 4 is a lateral cross-sectional view of the vehicle head light according to the embodiment of the invention.

As shown in FIG. 4, the heat radiating fins 20 having a plate-like shape are provided on the outer periphery of the pillar member 18 so as to project radially from the axis of the pillar member 18. The length of the pillar member 18 in the vertical direction is equal to the length of the heat radiating fins 20 in the vertical direction, so that the heat radiating fins 20 extend over the whole length of the pillar member 18.

Between the lower ends of the heat radiating fins 20 and the bottom wall 1*a*, there is provided a space large enough for the air of the volume depending on the height of the support member 24 to circulate. Incidentally, the length of the pillar member 18 may be different from the length of the heat radiating fins 20 depending on cases.

The heat radiating fins 20 are disposed at certain intervals so that the air can pass through each adjacent two of the heat radiating fins 20. The heat radiating fins 20 do not necessarily have to be provided over the whole periphery of the pillar member 18. The heat radiating fins 20 may be provided at a part of the outer periphery of the pillar member 18 so as not to interfere with the shade 10.

The heat radiating fins 20, which are made of thermally highly conductive material such as aluminum, are formed integrally with the pillar member 18 by aluminum casting. Alternatively, the heat radiating fins 20 may be formed by shaping an aluminum plate, and fixed to the outer periphery of the pillar member 18.

The pillar member 18 is formed in a shape of a circular cylinder in this embodiment, however, it may be formed in a shape of a prism such as a square pillar or a hexagonal pillar.

The guide wall 22 is disposed circumferentially surrounding the heat radiating fins 20 such that there are formed spaces 25 each of which is surrounded by the pillar member 18 and adjacent two of the heat radiating fins 20, and communicates with the light chamber 6 in the vertical direction. The side edge of each heat radiating fin 22 is sloped so that the guide wall 22 provided surrounding the heat radiating fins 22 while being in contact with the side edges of the heat radiating fins 22 is sloped to approach the pillar member 18 with increasing distance from its lower end. Accordingly, each of the spaces 25 surrounded by the pillar member 18 and adjacent two of the heat radiating fins becomes narrower with increasing distance from the bottom surface 1*a*.

A slit 26 for air communication between the light chamber 6 and each of the spaces 25 is provided for each space 25. The slits 26 are formed in the guide wall 22 to have a shape of a triangle having an angle section so that they become narrower with increasing distance from the lower end of the guide wall 22.

The slits 26 are not present in an upper portion of the guide wall 22. Accordingly, the air communication between the light chamber 6 and the spaces 25 is blocked by the guide wall 22 in their upper portions. Between the guide wall 22 and the rear wall 1*b* of the housing 1, a certain space is provided.

The guide wall 22 is made of thermally highly conductive material such as aluminum. The guide wall 22 may be formed from an aluminum plate of a circular arc shape. In this case, the guide wall 22 is fixed to the heat radiating fins 20 by brazing, for example. Alternatively, the pillar member 18, radiating fins 20 and guide wall 22 may be formed integrally by aluminum casting.

Figure 5A:
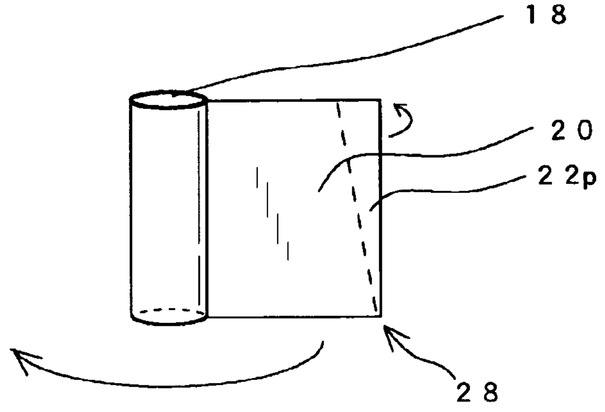
FIGS. 5A and 5B are diagrams for explaining a different method of forming heat radiating fins and a guide wall.

Further, as shown in FIG. 5A, a combination of a partial guide wall 22*p* and one heat radiating fin 20 may be formed from a rectangular plate member 28 by folding the edges of the rectangular plate member 28. In this case, the side edge of the plate member is folded such that a folding amount at the upper edge of the plate member 28 is larger, and a folding amount at the lower edge of the plate member 28 is smaller so that the plate member 28 is folded in the shape of a triangle to form the partial guide wall 22*p*.

Figure 5B:
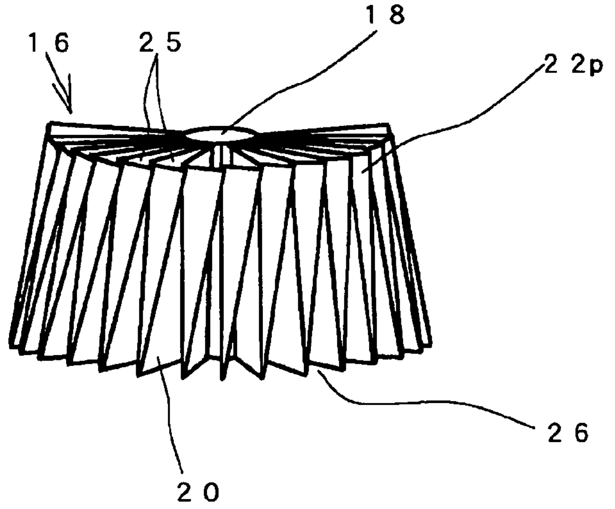

As shown in FIG. 5B, a plurality of the plate members 28 each integrally formed with the heat radiating fin 20 and the partial guide wall 22*p* are fixed radially to the outer periphery of the pillar member 18. As a result, the spaces 25 each surrounded by the pillar member 18, adjacent two of the heat radiating fins 20 and the guide wall 22 constituted of the partial guide walls 22*p* are formed as well as the slits 26. At the time of fixing the plate members 28, the upper edges of the partial guide walls 22*p* may be overlaid partially on their adjacent plate members 28, or alternatively, the upper corners of the partial guide walls 22*p* may be brought in contact with their adjacent plate members 28.

As shown in FIG. 1, a lead wire 30 one end of which is connected to the light source 12 is drawn to the outside through the rear wall 1*b* of the housing 1, and connected to a drive circuit 34 through a connector 32. The drive circuit 34 is a circuit for supplying electric power to the light source 12.

Next, the operation of the vehicle head light having the above described structure is explained. When the light source 12 is turned on, the light generated from the light source 12 is reflected by the reflector 14. Part of the light reflected from the reflector 14 is blocked by the shade 10. Part of the light not blocked by the shade 10 is projected forward by the projection lens 8.

The heat generated from the light source 12 transfers to the pillar member 18, and further transfers to the heat radiating fins 20. Further, the heat transfers from the heat radiating fins 20 to the guide wall 22. As a result, the air in the spaces 25 each surrounded by the pillar member 18, adjacent two of the heat radiating fins 20 and guide wall 22 is warmed by the heat radiated from the pillar member 18, heat radiating fins 20 and guide wall 22, and according expands.

The air which is warmed and accordingly becomes light moves up toward a ceiling wall 1*c* of the housing 1. Hence, the air entering the spaces 25 is warmed by the heat radiated from the pillar member 18, heat radiating fins 20 and guide wall 22, and moves up continuously.

The warmed air that has risen flows toward the lens cover 4 along the ceiling wall 1*c* of the housing 1 as shown by the arrow in FIG. 1. The warmed air is prevented from moving down by the reflector 14 and the shade 10. The warmed air inside the light chamber 6 exchanges heat with the outside air through the rear wall 1*b*, ceiling wall 1*c* and side walls of the housing 1 to be cooled.

The air moves down along the lens cover 4, and passes through the space between the bottom wall 1*a* of the housing 1 and the shade 10, during which the air exchanges heat with the outside air through the bottom wall 1*a*.

The air that has passed through the space between the bottom wall 1*a* and the shade 10 flows into the spaces 25 from below the heat radiating fins 20, and again moves up toward the ceiling wall 1*c* while being heated by the heat radiated from the pillar member 18, the heating fins 20 and the guide wall 22.

As described above, the air in the spaces 25 is warmed by the heat radiated from the pillar member 18, the heating fins 20 and the guide wall 22, flows along the ceiling wall 1*c* of the housing 1 toward the lens cover 4 while being cooled, flows along the bottom wall 1*a* of the housing 1 while being cooled, and again flows into the spaces 25.

By the provision of the guide wall 22, it can be prevented that the air that has been warmed and expanded in the spaces 25 flows to the light chamber 6 at halfway of the spaces 25, and the air in the light chamber 6 flows into the spaces 25 from halfway of the spaces 25. Because of such a funnel effect, a large pressure difference is caused between the upper side and lower side of the spaces 25. As a result, since the air is sucked into the lower side of the spaces 25, the air flows through the spaces 25 continuously, to enable radiation of the heat of the pillar member 18, heat radiating fins 20 and guide wall 22.

Figure 6A:
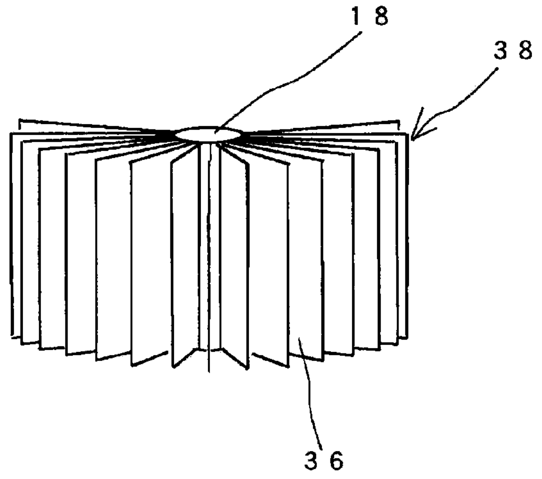
PRIOR ART FIG.6A
FIGS. 6A and 6B are diagrams for explaining advantages of the vehicle head light according to the embodiment of the invention compared to a conventional structure.
Figure 6B:
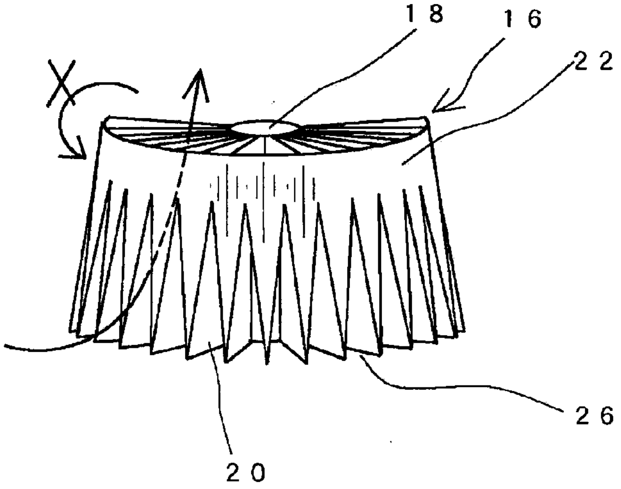

Hence, by the provision of the guide wall 22, the heat radiation area can be increased to thereby improve the heat radiation efficiency. FIG. 6A shows a conventional heat radiating member 38 constituted of the pillar member 18 and rectangular heat radiating fins 36 radially fixed to the pillar member 18 which is provided with no guide wall. FIG. 6B shows the heat radiating member 16 according to this embodiment provided with the guide wall 22. As seen from FIGS. 6A and 6B, the heat radiating member 16 according to this embodiment is smaller in dimensions for the same heat radiating area than the conventional heat radiating member 38.

The air temperature above the heat radiating member 16 is higher than the air temperate below the heat radiating member 16. By the provision of the guide wall 22, the high temperature air above the heat radiating member 16 is suppressed from entering the spaces 25 as shown by the curved arrow in FIG. 6B, while the low temperature below the heat radiating member 16 is promoted to enter the spaces 25.

Further, since the each space 25 is surrounded by the pillar member 18, radiating fins 20 and guide wall 22, the temperature distribution within each space 25 is nearly uniform, the temperature at the distal ends of the heating radiating fins distant from the light source 12 is close to the temperature of the pillar member 12 closer to the light source 12. Accordingly, since the difference between the temperature of the air passing through the spaces 25 and the temperature at the distal ends of the heat radiating fins 20 or the guide wall 22 is large, the heat radiation efficiency can be improved. Further, since the spaces 25 become narrower with increasing distance from their lower ends, and accordingly the flow speed of the air increases and heat radiation efficiency increases, the heat radiating member 16 can be made small in size.

Providing the guide wall 22 does not lead to increase of the air flow resistance in the spaces 25, because the air can enter the spaces 25 through the slits 26. Since the slits 26 are formed on the lower end side of the guide wall 22, and the upper end sides of the heat radiating fins 20 are surrounded by the guide wall 22, it can be prevented that the air enters the spaces 25 from the upper end sides of the heat radiating fins 20, and accordingly there is no concern that the funnel effect is impaired.

While the vehicle is running, since the lens cover 4 is hit by the wind, the heat transfer between the air outside the lens cover 4 and the air inside the lens cover 4 is promoted, and accordingly cooling of the light source 12 is promoted. Incidentally, when the vehicle runs in cold climates, snow or ice may adhere to the outer surface of the lens cover 4. However, since snow or ice adhered to the outer surface of the lens cover 4 is melted by the heat transferred from the inner surface of the lens cover 4, there is no concern that the projection of the light from the head light is impaired.

The above explained preferred embodiments are exemplary of the invention of the present application which is described solely by the claims appended below. It should be understood that modifications of the preferred embodiments may be made as would occur to one of skill in the art.

What is claimed is:

1. A vehicle head light comprising:

a housing formed with an opening at a front end of the housing;

a lens cover fixed to the opening to close an internal space of the housing as a light chamber;

a light source disposed in the light chamber; and a heat radiating member disposed in the light chamber to radiate heat generated from the light source to the light chamber, wherein the heat radiating member includes:

a pillar member provided to extend from a bottom wall of the housing, the light source being mounted on an upper end of the pillar member;

heat radiating fins having a plate shape and fixed radially to an outer periphery of the pillar member so as to extend in a longitudinal direction of the pillar member; and a guide wall provided surrounding sides of the heat radiating fins, the guide wall being sloped with respect to the bottom wall of the housing to approach the pillar member with increasing distance from a lower end of the guide wall so that spaces each formed by adjacent two of the heat radiating fins and the guide wall become narrower with increasing distance from the lower end of the guide wall, the guide wall being formed with slits to make air communication between the light chamber and each of the spaces, the slits being shaped to be narrower with increasing distance from the lower end of the guide wall.

2. The vehicle head light according to claim 1, wherein the slits are formed in a shape extending upward from the lower end of the guide wall.

3. The vehicle head light according to claim 1, wherein each of the slits is formed to be located between adjacent two of the heat radiating fins.

4. The vehicle head light according to claim 1, wherein the guide wall is a plate member formed with the slits and surrounding the sides of the heat radiating fins.

5. The vehicle head light according to claim 1, wherein the guide wall and the heat radiating fins are made of plate members, each of the plate members being folded at a side edge thereof by a folding amount increasing with increasing distance from a lower end of the plate member to form the heat radiating fin, and being formed with the slit.

* * * * *